United States Patent
Wu et al.

(10) Patent No.: US 11,944,106 B1
(45) Date of Patent: Apr. 2, 2024

(54) CONTINUOUS QUANTITATIVE SPRAYING STRUCTURE FOR STERILIZATION OF HARVESTED FRUIT

(71) Applicant: ZHEJIANG UNIVERSITY ZHONGYUAN INSTITUTE, Zhengzhou (CN)

(72) Inventors: Di Wu, Hangzhou (CN); Weinan Huang, Zhengzhou (CN); Dandan Zheng, Hangzhou (CN); Feng Jiang, Hangzhou (CN); Chongde Sun, Hangzhou (CN); Kunsong Chen, Hangzhou (CN)

(73) Assignee: ZHEJIANG UNIVERSITY ZHONGYUAN INSTITUTE, Zhengzhou (CN)

( * ) Notice: Subject to any disclaimer, the term of this patent is extended or adjusted under 35 U.S.C. 154(b) by 0 days.

(21) Appl. No.: 18/268,645

(22) PCT Filed: Oct. 8, 2022

(86) PCT No.: PCT/CN2022/123792
§ 371 (c)(1),
(2) Date: Jul. 27, 2023

(87) PCT Pub. No.: WO2023/138107
PCT Pub. Date: Jul. 27, 2023

(30) Foreign Application Priority Data

Jan. 21, 2022 (CN) .......................... 202210071881.0

(51) Int. Cl.
*F28D 21/00* (2006.01)
*A23B 7/158* (2006.01)
(Continued)

(52) U.S. Cl.
CPC .............. *A23B 7/158* (2013.01); *B65G 35/06* (2013.01); *B65G 47/248* (2013.01); *B65G 2201/0211* (2013.01)

(58) Field of Classification Search
CPC ...... A23B 7/158; B65G 35/06; B65G 47/248; B65G 2201/0211
(Continued)

(56) References Cited

U.S. PATENT DOCUMENTS

2004/0052702 A1* 3/2004 Shuman .................... A23L 3/28
422/208

FOREIGN PATENT DOCUMENTS

CN 103783635 A 5/2014
CN 206303160 U 7/2017
(Continued)

*Primary Examiner* — Brent T O'Hern
(74) *Attorney, Agent, or Firm* — Bayramoglu Law Offices LLC

(57) ABSTRACT

A continuous quantitative spraying structure for sterilization of harvested fruits is provided. The continuous quantitative spraying structure includes a track provided thereon with equally spaced trays for conveying fruits, where the trays each include a circular tray body; a central part of the tray body is provided with a central hole allowing the fruit to fall off; a bottom part of the central hole is provided with two parallel rollers; an inner bottom surface of the tray body is provided with a flap; an inner end of a central shaft of the roller passes through the flap, and is fixed to a rolling wheel; a bearing is provided between the roller and the flap; the track is provided with a spraying sterilization section; the spraying sterilization section is sequentially provided with 3 to 4 sets of sterilization nozzles above a tray conveying route.

17 Claims, 9 Drawing Sheets

(51) Int. Cl.
*B65G 35/06* (2006.01)
*B65G 47/248* (2006.01)

(58) Field of Classification Search
USPC .......................................................... 426/335
See application file for complete search history.

(56) References Cited

FOREIGN PATENT DOCUMENTS

| | | |
|---|---|---|
| CN | 209628535 U | 11/2019 |
| CN | 213486760 U | 6/2021 |
| CN | 113181396 A | 7/2021 |
| CN | 114304259 A | 4/2022 |

* cited by examiner

CONTINUOUS QUANTITATIVE SPRAYING STRUCTURE FOR STERILIZATION OF HARVESTED FRUIT

CROSS REFERENCE TO THE RELATED APPLICATIONS

This application is the national phase entry of International Application No. PCT/CN2022/123792, filed on Oct. 8, 2022, which is based upon and claims priority to Chinese Patent Application No. 202210071881.0, filed on Jan. 21, 2022, the entire contents of which are incorporated herein by reference.

TECHNICAL FIELD

The present disclosure belongs to the field of processing devices of harvested fruits, and relates to a sterilization device of harvested fruits, in particular to a continuous quantitative spraying structure for sterilization of harvested fruits.

BACKGROUND

With the improvements in people's living standards, high-quality fresh fruits have increasingly become an important component of people's daily nutrition supply. In recent years, the continuous development of agricultural science and technology has put forward higher requirements for post-harvest sterilization, preservation, and grading of fruits. Post-harvest sterilization of fruits usually involves soaking or spraying a sterilant, such as a sterilant made with low-concentration peroxyacetic acid. In soaking sterilization, the sterilant can easily be excessively used, and the subsequent discharge and cleaning of the sterilant has adverse effects on the environment due to the sterilant excessively used. Besides, after soaking, the fruits need to be dried for a long time before storage. Therefore, the soaking sterilization method has low efficiency, and is not conducive to large-scale fruit processing. In spraying sterilization, it is necessary to spray all sides of the fruit to ensure the sterilization effect. The existing spraying sterilization devices are mostly controlled by intermittent manual operations, making it hard to achieve continuous spraying sterilization. In addition, quantitative spraying sterilization cannot be achieved without accurately locating the fruit, and the sterilant may also be excessively used to cause a series of environmental issues, hindering the achievement of energy conservation and environmental protection.

SUMMARY

An objective of the present disclosure is to provide a continuous quantitative spraying structure for sterilization of harvested fruits. The present disclosure solves the problem in traditional post-harvest sterilization methods of fruits, that is, the sterilant may be excessively used to cause a series of environmental issues, hindering the achievement of energy conservation and environmental protection. The present disclosure sprays a sterilant onto precisely located fruits that roll on a tray. The present disclosure achieves quantitative spraying of the sterilant and solves the problem of excessive use of the sterilant. In addition, the present disclosure simplifies the subsequent fruit drying process and improves the efficiency of sterilization by controlling and reducing the dosage of the sterilant.

In order to solve the technical problem, the present disclosure adopts the following technical solution: a continuous quantitative spraying structure for sterilization of harvested fruits. The continuous quantitative spraying structure includes a track provided thereon with equally spaced trays for conveying fruits, where the trays each include a circular tray body; a central part of the tray body is provided with a central hole allowing the fruit to fall off; a bottom part of the central hole is provided with two parallel rollers that are able to synchronously swing up and down; an inner bottom surface of the tray body is provided with a swingable flap; an inner end of a central shaft of the roller passes through the flap, and is fixed to a rolling wheel; a bearing is provided between the roller and the flap, and a bearing is provided between an outer end of the roller and an outer bottom surface of the tray body; the track is provided with a spraying sterilization section; the spraying sterilization section is sequentially provided with 3 to 4 sets of sterilization nozzles above a tray conveying route; a receiving tank is provided below the spraying sterilization section; the spraying sterilization section is provided with a rolling belt; the rolling belt is located above the rolling wheel and fitted with the rolling wheel to drive the rolling wheel to roll; and the rolling belt is parallel to the track.

In operation, each tray carries one fruit. The roller is made of flexible silicone, latex, etc. to avoid bumps and bruises on the fruit. The roller is not directly rubbed to roll. Instead, it is driven to roll through the rolling of the rolling wheel, so as to prevent the roller from contacting the outside, thus ensuring cleanliness and hygiene of the roller. When the tray reaches the spraying sterilization section, the tray is continuously transported. Meanwhile, the rolling wheel is fitted with the rolling belt to rotate, so as to drive the roller to rotate. Thus, the fruit on the roller in the tray is rolled. There are 3 to 4 sets of sterilization nozzles sequentially arranged along the conveying direction. The position of the rolling wheel is aligned with the position of the tray. The position of the tray can be located based on the position of the rolling wheel, and the corresponding sterilization nozzle can be driven to quantitatively spray a sterilant by monitoring the position of the rolling wheel. The multiple sets of sterilization nozzles can provide full-coverage, precise quantitative spraying on all sides of the fruit during the rolling process, thereby reducing the amount of the sterilant used. A start signal of the sterilization nozzle is sent by a switch triggered by the rolling wheel or a position sensor that monitors the position of the rolling wheel. Due to the hollow structure of the tray, a small amount of excess sterilant sprayed above can fall into the receiving tank through a gap between the rollers. The amount of the sterilant is precisely controlled, and only a small amount of the sterilant is applied. Therefore, the subsequent drying process can be completed in a short time, improving production efficiency and reducing energy consumption. When the fruit is discharged, the flap drives the rollers to flip, such that the fruit falls from the central hole of the tray. Based on the structure of the tray, a machine vision section may also be provided at a front end of the spraying sterilization section. The machine vision section is provided with a rolling belt above the rolling wheel. The rolling belt drives the rollers to rotate to cause the fruit to roll. A high-definition camera is provided above the tray to take images of each side of the fruit during the rolling process, so as to grade out the fruit based on its size and damage detection results. In the discharge section, the rollers are driven to swing at different positions according to different grading requirements.

Preferably, the rolling belt is a rotating belt, and two ends of the rolling belt are respectively provided with a first driving wheel and a second driving wheel with opposite rotation directions; the first driving wheel and the second driving wheel are respectively driven by independent motors; and driven wheels are equally spaced between the first driving wheel and the second driving wheel. The rolling belt is rotatable, and can achieve forward and reverse rotation through the first driving wheel and the second driving wheel, respectively. When there is a significant difference in the size of different fruits, the rolling belt is rotated in a same direction as the rolling wheel to reduce a rolling speed of the fruit. Alternatively, the rolling belt and the rolling wheel are rotated in opposite directions to accelerate the rolling of the fruit. Through this design, when the fruit reaches the position of the sterilization nozzle, the fruit has been rolled at a suitable angle. Furthermore, when the machine vision section is added at the front end of the spraying sterilization section, the rolling belt is rotated based on the size of the fruit on the tray, so as to adjust the rolling speed of the fruit on each tray in real time.

Preferably, a set of sterilization nozzles includes a sterilization nozzle located directly above the tray, or a set of sterilization nozzles includes two sterilization nozzles diagonally arranged on two sides directly above the tray.

Preferably, the rollers each are provided with a silicone or latex surface. Contact surfaces of the rolling belt and the rolling wheel both are rubber surfaces to avoid slipping. The surface of the roller is flexible to avoid bruises.

Preferably, an inner side of the tray body is provided with a slide carriage; the track is provided with a slider; the slide carriage is detachably buckled onto the slider; the slide carriage and the tray body enclose a quadrangular hollow; and the flap is provided at the quadrangular hollow.

Preferably, an inner upper end of the tray body is provided with an inwardly protruding limiting element for limiting swing amplitude of the roller. The limiting element supports the central shaft at the inner end of the roller to avoid collision with the surface of the roller.

Preferably, with a swing shaft of the flap as a fulcrum, a gravitational torque of the inner end of the central shaft of the roller is greater than a gravitational torque of an outer end of the roller and less than a sum of the gravitational torque of the outer end of the roller and a gravitational torque of the fruit. When there is no fruit on the tray, the roller can swing up to a bottom surface of the tray with the help of a gravitational torque. When there is a fruit on the roller, it is necessary to use a snap or auxiliary track to support the roller and release the snap in the discharge section. Alternatively, the auxiliary track may not be provided, and the fruit is discharged by its own weight.

Preferably, the track is a racetrack-type circular track, and is sequentially provided with a feeding section, the spraying sterilization section, an air drying section, and a discharge section along a conveying direction. A machine vision section may be additionally provided between the feeding section and the spraying sterilization section. The air drying section may be configured to perform air drying with atmospheric-pressure plasma.

Preferably, an outer side of each section of the track, except for the discharge section, is provided with an auxiliary track for rolling of the bearing located at the outer end of the roller; and the auxiliary track is provided with arc-shaped guide sections at two ends of the discharge section of the track.

Preferably, a press-to-release snap structure is provided between an end surface of the bearing located at the outer end of the roller and an outer side wall of the tray body.

The present disclosure drives the fruit to roll on the tray through the rollers, identifies the position of the tray, and accurately sprays the sterilant on each side of the fruit in stages. The present disclosure ensures the quantitative and uniform spraying of the sterilant, and avoids excessive use of the sterilant, achieving energy conservation and emission reduction, and improving production efficiency.

BRIEF DESCRIPTION OF THE DRAWINGS

The present disclosure is further described below according to the drawings.

Figure 1:
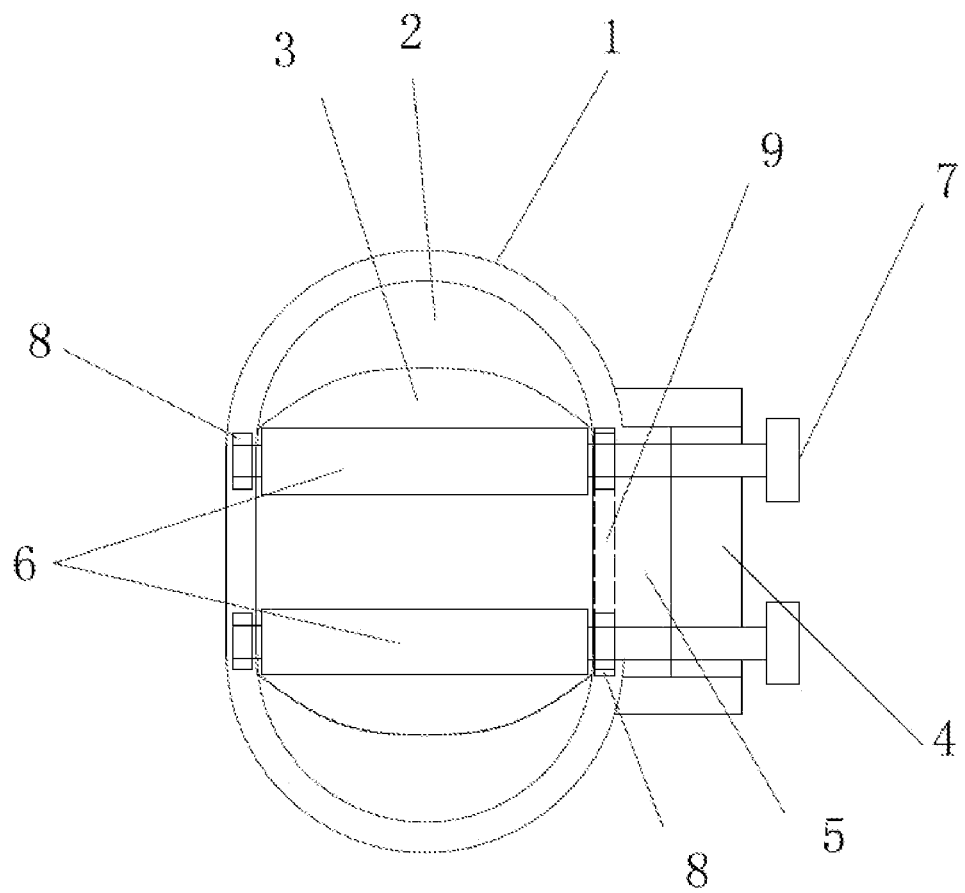
FIG. 1 is a structural diagram of a tray structure according to the present disclosure.

REFERENCE NUMERALS 1. tray; 2. tray body; 3. central hole; 4. slide carriage; 5. limiting element; 6. roller; 7. rolling wheel; 8. bearing; 9. flap; 10. snap structure; 11. slider; 12. track; 13. rolling belt; 14. sterilization nozzle; 15. receiving tank; 16. first driving wheel; 17. second driving wheel; 18. driven wheel; 19. auxiliary track; 20. fruit; A. feeding section; B. spraying sterilization section; C. air drying section; D. discharge section; and E. machine vision section.

DETAILED DESCRIPTION OF THE EMBODIMENTS

The present disclosure is further described below according to the specific embodiments and drawings.

Figure 4:
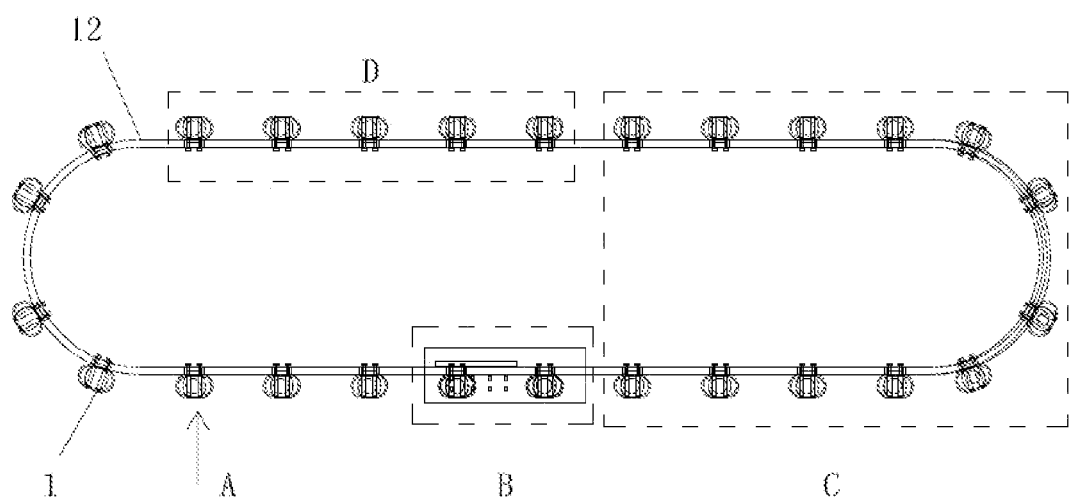
FIG. 4 is a schematic diagram of a layout of a track according to the present disclosure.

Embodiment 1: This embodiment provides a continuous quantitative spraying structure for sterilization of harvested fruits. As shown in FIG. 4, the quantitative spraying structure includes racetrack-type rotating track 12. The track is provided thereon with equally spaced trays 1 for conveying fruits. The track is sequentially provided with feeding section A, spraying sterilization section B, air drying section C, and discharge section D along a conveying direction. The air drying section is configured to perform air drying with atmospheric-pressure plasma and secondary sterilization.

Figure 2:
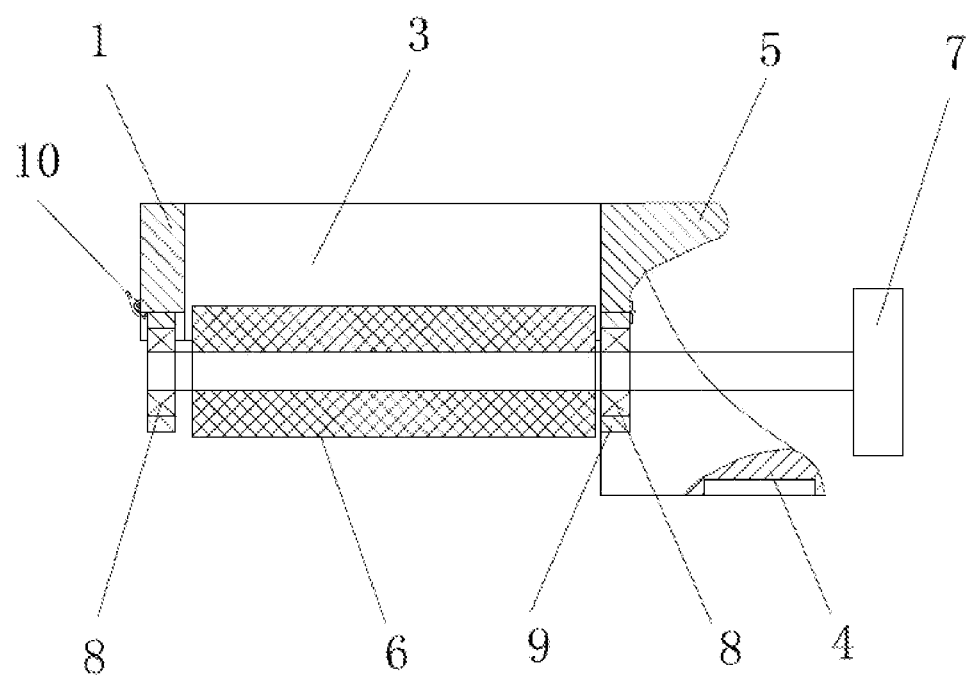
FIG. 2 is a section view of the tray structure according to the present disclosure.
Figure 3:
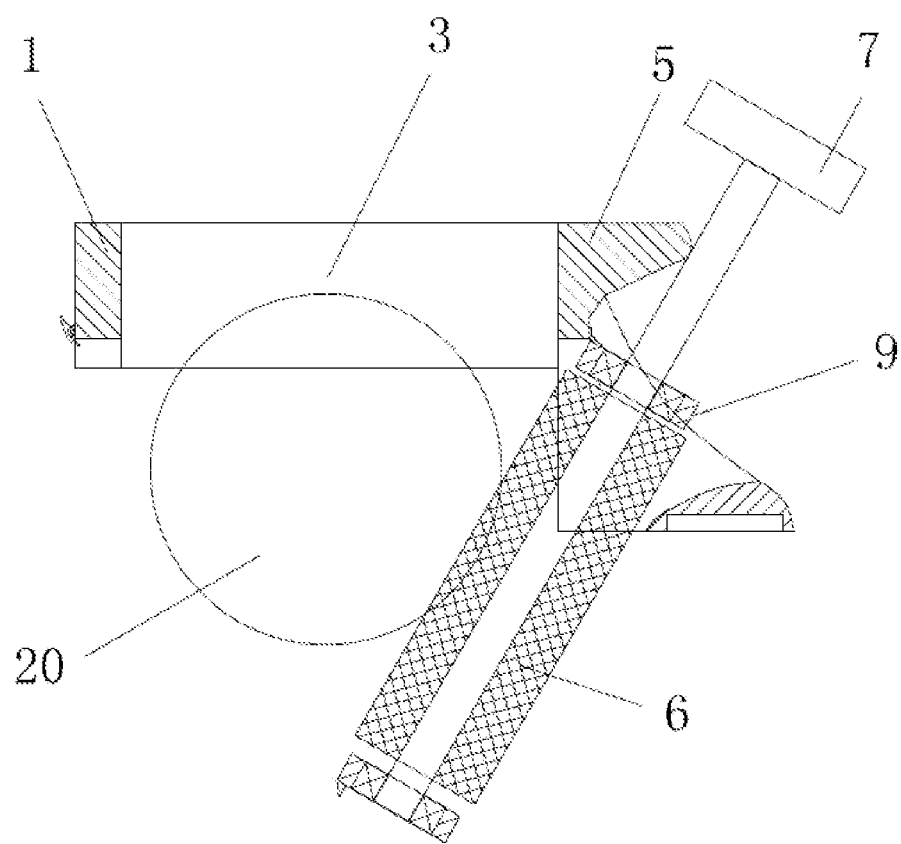
FIG. 3 is a schematic diagram showing that a roller of the tray structure shown in FIG. 2 swings down for a discharging purpose according to the present disclosure.
Figure 5:
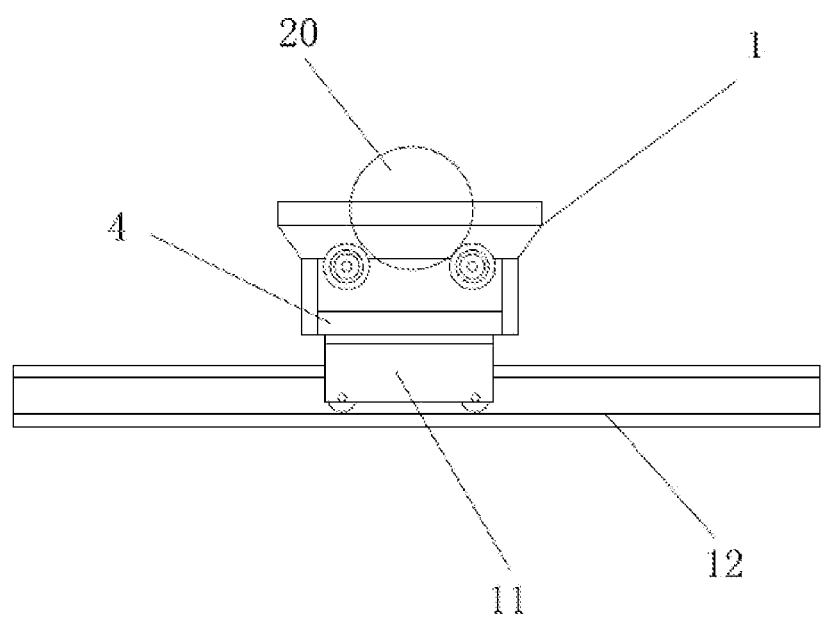
FIG. 5 is a schematic diagram showing that a tray on a track conveys a fruit according to the present disclosure.

As shown in FIGS. 1, 2, and 3, the tray 1 include circular tray body 2. A central part of the tray body is provided with central hole 3 allowing the fruit to fall off. A bottom part of the central hole is provided with two parallel rollers 6 that are able to synchronously swing up and down. An inner bottom surface of the tray body is provided with swingable flap 9. An inner end of a central shaft of the roller passes through the flap and is fixed to rolling wheel 7. Bearing 8 is provided between the roller and the flap. Bearing 8 is provided between an outer end of the roller and an outer bottom surface of the tray body. As shown in FIG. 5, an inner side of the tray body is provided with slide carriage 4. The track 12 is provided with slider 11. The slide carriage 4 is detachably buckled onto the slider 11. The slide carriage and the tray body enclose a quadrangular hollow. The flap is provided at the quadrangular hollow. An inner upper end of the tray body is provided with inwardly protruding limiting element 5 for limiting swing amplitude of the roller. With a swing shaft of the flap as a fulcrum, a gravitational torque of the inner end of the central shaft of the roller is greater than a gravitational torque of an outer end of the roller and less than a sum of the gravitational torque of the outer end of the roller and a gravitational torque of the fruit 20. As shown in FIG. 2, when the roller is unloaded, a right side of the flap is subjected to a greater gravitational torque, and the roller is reset to be horizontal. As shown in FIG. 3, when the roller is loaded, a left side of the flap is subjected to a greater gravitational torque. When snap structure 10 is loosened or the roller is not supported by an auxiliary track, the roller is swung down to discharge the fruit.

Figure 6:
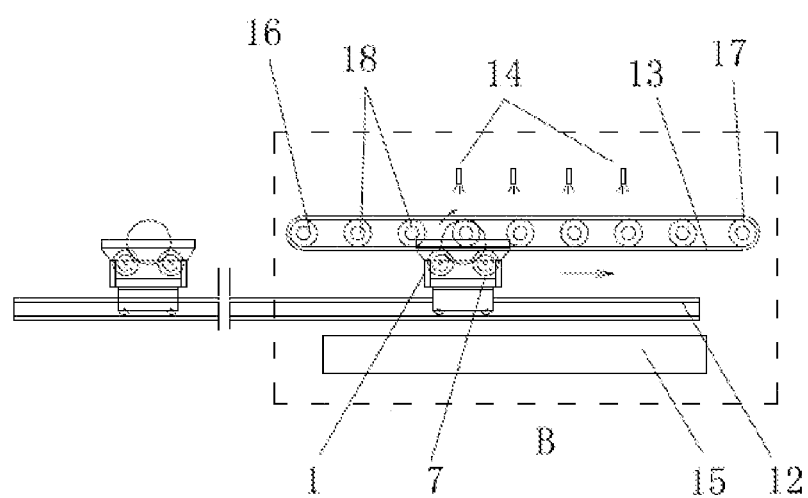
FIG. 6 is a structural diagram of a spraying sterilization section above the track according to the present disclosure.
Figure 7:
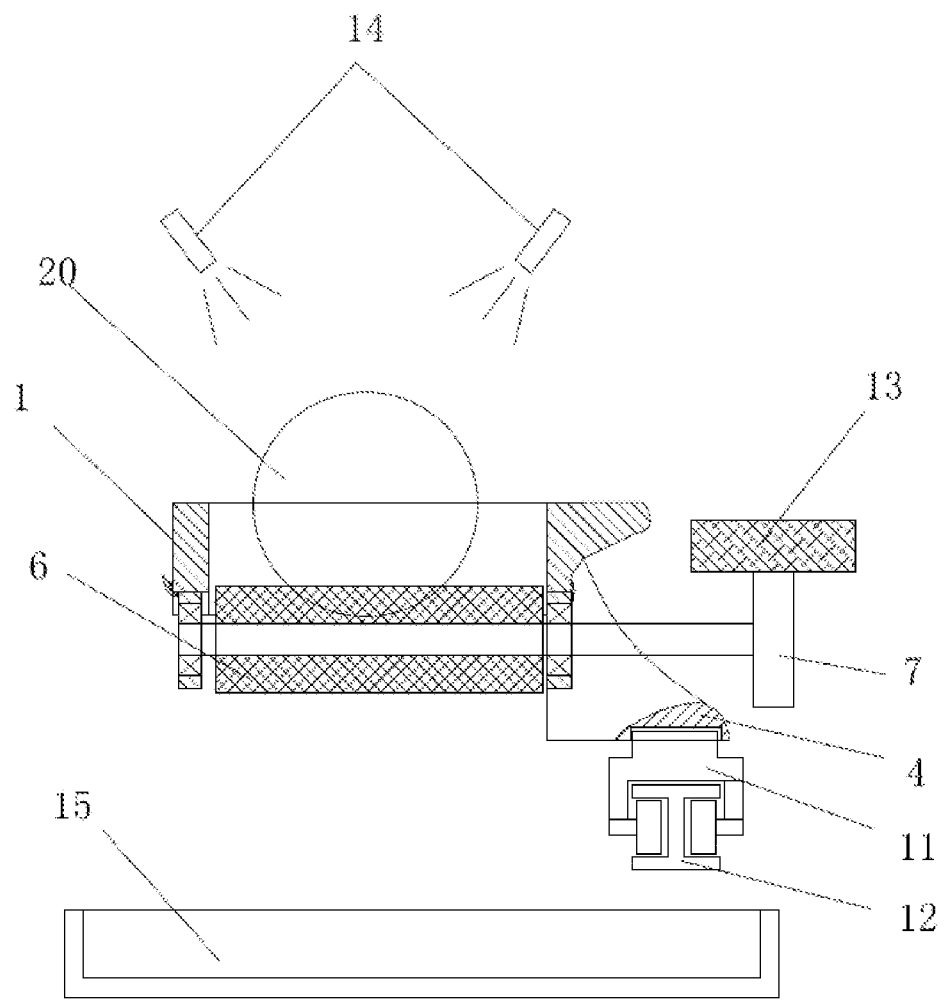
FIG. 7 is a section view of the spraying sterilization section according to the present disclosure.

As shown in FIGS. 6 and 7, the spraying sterilization section B is sequentially provided with four sets of sterilization nozzles 14 located above a tray conveying route. Receiving tank 15 is located below the spraying sterilization section B. The spraying sterilization section B is provided with rolling belt 13 located above the rolling wheel 7 and fitted with the rolling wheel to drive the rolling wheel to roll. The rolling belt 13 is parallel to the track 12. The rolling belt drives the rolling wheel from above to avoid a force causing the roller to swing. The rolling belt is a rotating belt, and two ends of the rolling belt are respectively provided with first driving wheel 16 and second driving wheel 17 with opposite rotation directions. The first driving wheel and the second driving wheel are respectively driven by independent motors. Driven wheels 18 are equally spaced between the first driving wheel and the second driving wheel. The rolling belt is rotatable, and can achieve forward and reverse rotation through the first driving wheel and the second driving wheel, respectively. When there is a significant difference in the size of different fruits, the rolling belt is rotated in a same direction as the rolling wheel to reduce a rolling speed of the fruit. Alternatively, the rolling belt and the rolling wheel are rotated in opposite directions to accelerate the rolling of the fruit. Through this design, when the fruit reaches the position of the sterilization nozzle, the fruit has been rolled at a suitable angle. A position of the rolling wheel is aligned with a position of the tray. The position of the tray can be located based on the position of the rolling wheel, and the corresponding sterilization nozzle can be driven to quantitatively spray a sterilant by monitoring the position of the rolling wheel. The multiple sets of sterilization nozzles can provide full-coverage, precise quantitative spraying on all sides of the fruit during the rolling process, thereby reducing the amount of the sterilant used. A start signal of the sterilization nozzle is sent by a switch triggered by the rolling wheel or a position sensor that monitors the position of the rolling wheel.

Figure 8:
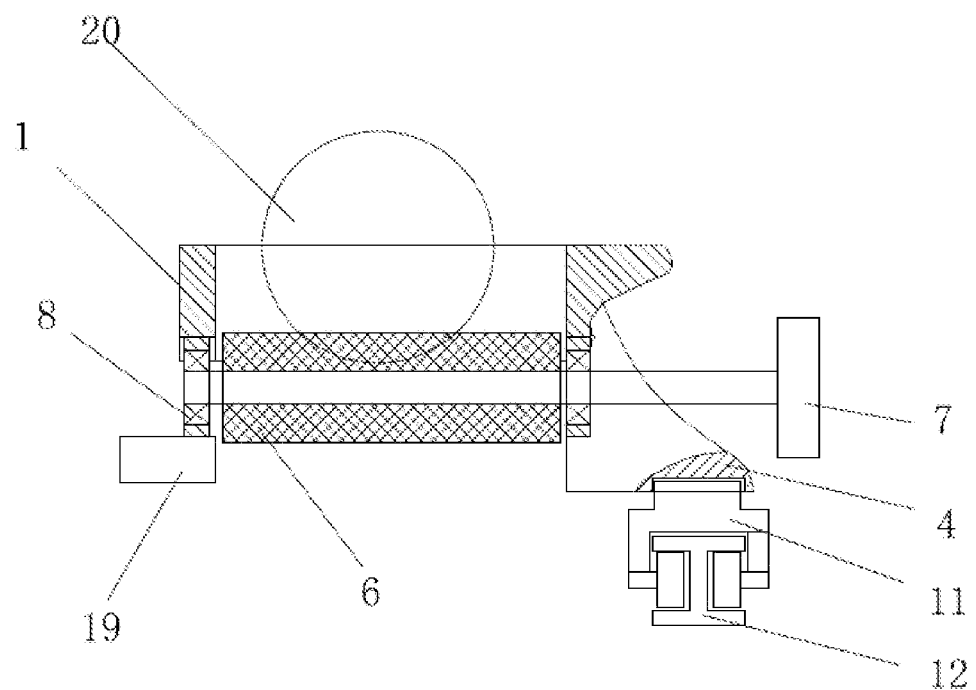
FIG. 8 is a structural diagram of an auxiliary track according to the present disclosure.

As shown in FIGS. 2 and 3, the snap structure is a press-to-release snap structure, and is provided between an end surface of the bearing located at the outer end of the roller and an outer side wall of the tray body. Alternatively, as shown in FIG. 8, the snap structure may not be provided. In this case, an outer side of each section of the track 12, except for the discharge section D, is provided with the auxiliary track 19 for rolling of the bearing located at the outer end of the roller. The auxiliary track 19 is shown in FIG. 8. The auxiliary track is provided with arc-shaped guide sections at two ends of the discharge section of the track.

Figure 9:
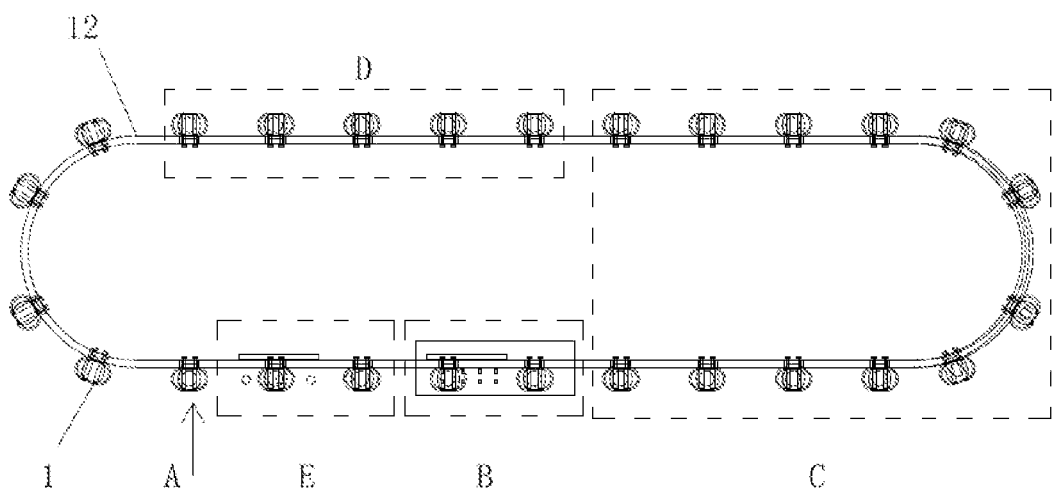
FIG. 9 is a schematic diagram of another layout of the track according to the present disclosure.

Embodiment 2: This embodiment provides a continuous quantitative spraying structure for sterilization of harvested fruits, as shown in FIG. 9. In this embodiment, a machine vision section is additionally provided between the feeding section A and the spraying sterilization section B. The same rolling belt structure as at the spraying sterilization section B is provided to drive the fruit to roll on the tray. A high-definition camera is provided above the machine vision section to capture images of various sides of the fruit for size and damage detection. In the discharge section, the fruit is graded out based on detected information. The remaining structures of this embodiment are the same as those in Embodiment 1. In this embodiment, a fruit grader based on machine vision is adopted, which is available in the prior art. This embodiment aims to demonstrate that the spraying sterilization structure of the present disclosure can be effectively combined with the existing machine vision-based fruit grader to achieve one-stop fruit grading and sterilization treatment.

What is claimed is:

1. A continuous quantitative spraying structure for a sterilization of harvested fruits, comprising a track provided thereon with equally spaced trays for conveying fruits, wherein the trays each comprise a circular tray body;
    a central part of the circular tray body is provided with a central hole allowing fruit to fall off;
    a bottom part of the central hole is provided with two parallel rollers, wherein the two parallel rollers are configured to synchronously swing up and down;
    an inner bottom surface of the circular tray body is provided with a swingable flap;
    an inner end of a central shaft of the rollers passes through the swingable flap, and is fixed to a rolling wheel;
    a bearing is provided between the rollers and the swingable flap, and a bearing is provided between an outer end of the rollers and an outer bottom surface of the circular tray body;
    the track is provided with a spraying sterilization section;
    the spraying sterilization section is sequentially provided with 3 to 4 sets of sterilization nozzles above a tray conveying route;
    a receiving tank is provided below the spraying sterilization section;
    the spraying sterilization section is provided with a rolling belt;
    the rolling belt is located above the rolling wheel and fitted with the rolling wheel to drive the rolling wheel to roll; and
    the rolling belt is parallel to the track.

2. The continuous quantitative spraying structure according to claim 1, wherein the rolling belt is a rotating belt, and two ends of the rolling belt are respectively provided with a first driving wheel and a second driving wheel with opposite rotation directions; the first driving wheel and the second driving wheel are respectively driven by independent motors; and driven wheels are equally spaced between the first driving wheel and the second driving wheel.

3. The continuous quantitative spraying structure according to claim 1, wherein a set of sterilization nozzles comprises a sterilization nozzle located directly above each of the trays, or a set of sterilization nozzles comprises two sterilization nozzles diagonally arranged on two sides directly above each of the trays.

4. The continuous quantitative spraying structure according to claim 1, wherein the rollers each are provided with a silicone or latex surface.

5. The continuous quantitative spraying structure according to claim 1, wherein an inner side of the circular tray body is provided with a slide carriage; the track is provided with a slider; the slide carriage is detachably buckled onto the slider; the slide carriage and the circular tray body enclose a quadrangular hollow; and the swingable flap is provided at the quadrangular hollow.

6. The continuous quantitative spraying structure according to claim 1, wherein an inner upper end of the circular tray body is provided with an inwardly protruding limiting element for limiting a swing amplitude of the rollers.

7. The continuous quantitative spraying structure according to claim 1, wherein with a swing shaft of the swingable flap as a fulcrum, a gravitational torque of the inner end of the central shaft of the rollers is greater than a gravitational torque of the outer end of the rollers and less than a sum of the gravitational torque of the outer end of the rollers and a gravitational torque of the fruit.

8. The continuous quantitative spraying structure according to claim 1, wherein the track is a racetrack-type circular track, and is sequentially provided with a feeding section, the spraying sterilization section, an air drying section, and a discharge section along a conveying direction.

9. The continuous quantitative spraying structure according to claim 8, wherein an outer side of each section of the track, except for the discharge section, is provided with an auxiliary track for rolling of the bearing located at the outer end of the rollers; and the auxiliary track is provided with arc-shaped guide sections at two ends of the discharge section of the track.

10. The continuous quantitative spraying structure according to claim 1, wherein a press-to-release snap structure is provided between an end surface of the bearing located at the outer end of the rollers and an outer side wall of the circular tray body.

11. The continuous quantitative spraying structure according to claim 2, wherein a set of sterilization nozzles comprises a sterilization nozzle located directly above each of the trays, or a set of sterilization nozzles comprises two sterilization nozzles diagonally arranged on two sides directly above each of the trays.

12. The continuous quantitative spraying structure according to claim 2, wherein the rollers each are provided with a silicone or latex surface.

13. The continuous quantitative spraying structure according to claim 2, wherein an inner side of the circular tray body is provided with a slide carriage; the track is provided with a slider; the slide carriage is detachably buckled onto the slider; the slide carriage and the circular tray body enclose a quadrangular hollow; and the swingable flap is provided at the quadrangular hollow.

14. The continuous quantitative spraying structure according to claim 2, wherein an inner upper end of the circular tray body is provided with an inwardly protruding limiting element for limiting a swing amplitude of the rollers.

15. The continuous quantitative spraying structure according to claim 2, wherein with a swing shaft of the swingable flap as a fulcrum, a gravitational torque of the inner end of the central shaft of the rollers is greater than a gravitational torque of the outer end of the rollers and less than a sum of the gravitational torque of the outer end of the rollers and a gravitational torque of the fruit.

16. The continuous quantitative spraying structure according to claim 2, wherein the track is a racetrack-type circular track, and is sequentially provided with a feeding section, the spraying sterilization section, an air drying section, and a discharge section along a conveying direction.

17. The continuous quantitative spraying structure according to claim 2, wherein a press-to-release snap structure is provided between an end surface of the bearing located at the outer end of the rollers and an outer side wall of the circular tray body.

\* \* \* \* \*